(12) United States Patent
Han et al.

(10) Patent No.: US 9,398,494 B2
(45) Date of Patent: Jul. 19, 2016

(54) METHODS, DEVICES AND COMPUTER PROGRAM PRODUCTS PROVIDING FOR IMPROVED RANDOM ACCESS IN A LOCAL AREA NETWORK ENVIRONMENT

(75) Inventors: Jing Han, Beijing (CN); Wei Bai, Beijing (CN); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 125 days.

(21) Appl. No.: 14/130,553

(22) PCT Filed: Jul. 4, 2011

(86) PCT No.: PCT/CN2011/076830
§ 371 (c)(1),
(2), (4) Date: Jan. 2, 2014

(87) PCT Pub. No.: WO2013/004002
PCT Pub. Date: Jan. 10, 2013

(65) Prior Publication Data
US 2014/0140294 A1  May 22, 2014

(51) Int. Cl.
*H04W 28/26* (2009.01)
*H04W 74/08* (2009.01)
*H04W 74/00* (2009.01)

(52) U.S. Cl.
CPC .......... *H04W 28/26* (2013.01); *H04W 74/0833* (2013.01); *H04W 74/004* (2013.01)

(58) Field of Classification Search
None
See application file for complete search history.

(56) References Cited

U.S. PATENT DOCUMENTS

| 2011/0110258 A1* | 5/2011 | Ishii et al. ..................... 370/252 |
| 2011/0237265 A1* | 9/2011 | Sugawara et al. ............. 455/450 |

FOREIGN PATENT DOCUMENTS

| CN | 101572920 | 11/2009 |
| CN | 101998488 | 3/2011 |
| KR | 20020033919 | 5/2002 |
| WO | WO 2009/157124 | * 12/2009 |

* cited by examiner

*Primary Examiner* — Benjamin H Elliott, IV
(74) *Attorney, Agent, or Firm* — Oblon, McClelland, Maier & Neustadt, L.L.P

(57) ABSTRACT

The present invention proposes methods in relation to providing for random access in a local area network environment, and encompasses, from an eNB perspective, defining (S1) a set of N dedicated preambles among a total number X of preambles, allocating (S4) a dedicated preamble to a terminal responsive to a connection request received from said terminal, and identifying (S9) said terminal when requesting random access, based on the allocated dedicated preamble contained in a random access request received. From a UE perspective, it encompasses requesting (S3) a connection to be established with a network transceiver device, receiving (S5) information on a dedicated preamble being allocated, and issuing (S8) a random access request to said network transceiver device which includes the allocated dedicated preamble. It also addresses correspondingly configured devices and computer program products.

18 Claims, 4 Drawing Sheets

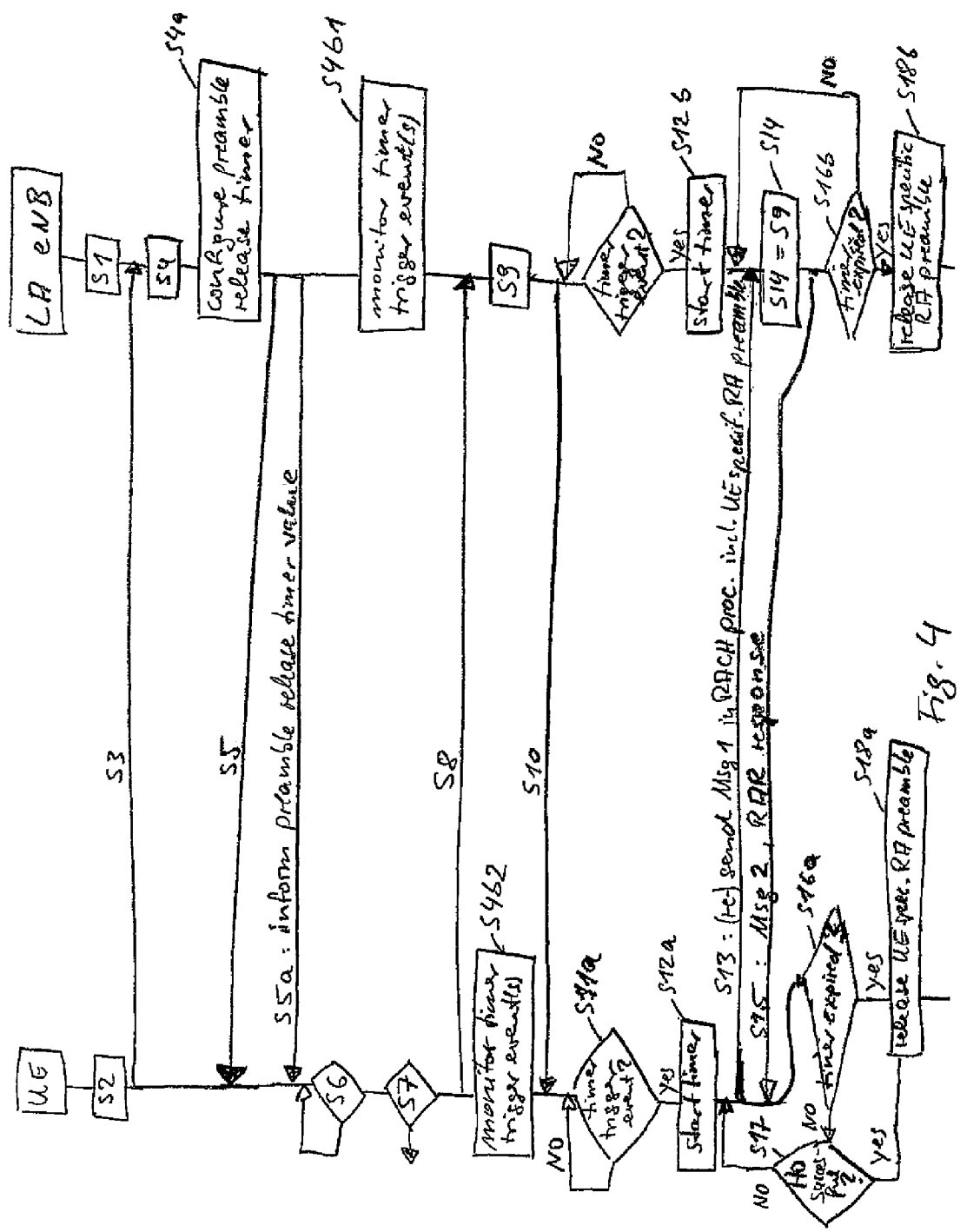

METHODS, DEVICES AND COMPUTER PROGRAM PRODUCTS PROVIDING FOR IMPROVED RANDOM ACCESS IN A LOCAL AREA NETWORK ENVIRONMENT

FIELD OF THE INVENTION

The present invention relates to methods, devices and computer program products providing for improved random access in a local area network environment.

More specifically, the present invention relates to such methods, devices and computer program products which are configured to be implemented in, on a network side, transceiver devices such as evolved Node_B's (when for example referring to LTE/LTE-A), as well as implemented in, on a terminal side, transceiver devices such as a user equipment UE.

BACKGROUND

As an example for exemplifying the present invention, it is referred hereinafter to mobile data transmission and data services, which are constantly making progress. With the increasing penetration of such services, a need for increased bandwidth for conveying the data is emerging. With the progressive development of new systems and standards, such increased bandwidth and other features and characteristics is/are realized.

For example, LTE-Advance (LTE-A) is the evolution system for LTE in 3GPP, which is targeted to provide a much higher UE (data) throughput, less delay in end-to-end packet transmission, lower costs per bit, as well as to generally improve the performance and to enhance the scheme for more network deployment scenarios.

Among those deployment scenarios, LTE local area (LA) deployment is a very important and hot studied scenario. Such local area LA deployment normally covers a short range e.g. tens of meters, and access of only a small number of UEs is expected. Typically, such local area scenario is for example used to provide for indoor coverage and/or for coverage of company areas (indoor as well as outdoor with limited size).

As mentioned above, the LA deployment in LTE-Advance is expected to provide the short range coverage e.g. tens of meters, and also the number of users and/or UE's accessing and/or randomly accessing such local area network is expected to be rather low, e.g. less then ten UEs. Those UEs will follow existing procedures as defined under LTE and/or LTE-A for gaining random access to a channel.

In brief, currently, there are totally six events to trigger random access in LTE system. Those events are
1) Initial access from RRC_IDLE
2) RRC Connection Re-establishment procedure
3) Handover
4) DL data arrival and UL non-sync during RRC_CONNECTED requiring random access procedure
5) UL data arrival and UL non-sync during RRC_CONNECTED requiring random access procedure
6) For positioning purpose during RRC_CONNECTED requiring random access procedure For event 2) mentioned above, there are five initializations, which are:
1) Radio link failure
2) handover failure
3) mobility from E-UTRA failure
4) integrity check failure indication from lower layers
5) RRC connection reconfiguration failure Since a local area LA has only a small coverage, a radio link between LA UE and LA eNB will probably be good enough to prevent initialization reasons 1) and 4) to occur. But still, at least initialization 2), 3) and 5) could still occur in a LA scenario. Thus, for example, event 2) could trigger RACH in LA scenario.

Among those earlier mentioned six events to trigger a RACH procedure, at least for events 1), 2) and 5) a contention based RACH procedure is required, since eNB does not know when any of the events happens and thus is not able to schedule a non-contention based RACH.

Normally contention based RACH include 4 steps and correspondingly 4 messages:
Step#1: UE sends a preamble to the eNB (Msg1)
Step#2: eNB sends (Msg2) a random access response, RAR, to the requesting UE;
Step#3: UE in turn sends Msg3 to eNB;
Step#4: eNB sends Msg4 to UE; this could be UL grant, DL assignment, UE contention resolution identity etc.

However, there are delays involved in contention based RACH procedures, which are based on the following reasons. From step#1 to step#2, at least 4 ms are required; from step#2 to step#3, at least 6 ms are required; from step#3 to step#4, at least 4 ms are required.

Hence, the minimum time for such RACH procedure takes 14 ms. But to achieve this minimum time, all the following conditions should be fulfilled simultaneously, which assumes that the RAR target for this UE is correctly received at the first subframe of RAR window; no delay configured for Msg3 and Msg3 is correctly received by eNB at the first transmission; Msg4 is correctly received by UE at the first possible chance and contention resolution is successful at the same time; there is no backoff, no Msg3 retransmissions, no preamble retransmission during the whole RACH procedure.

Obviously this is not the normal case for contention based RACH even for LA scenario. And the delay for contention based RACH could thus probably exceed thousands of millisecond for the worst case.

Based on these characteristics of a LA deployment, LTE features and procedure could be further optimized and enhanced to provide higher UE throughput and fewer delay. In particular, the RACH procedure in LA deployment is still desired to be improved in order to reach the target mentioned above.

It is thus an object of the present invention to improve local area deployments such as those under LTE and/or LTE-A.

SUMMARY

The present invention addresses such situation and proposes, in exemplary embodiments, new solutions to efficiently provide methods, apparatuses and computer program products, respectively, for providing for random access in a local area network environment.

Various aspects and related examples of the invention are set out in the claims.

In particular, according to a first aspect of the present invention, there is provided
a method, comprising providing for random access in a local area network environment, and defining (S1) a set of N dedicated preambles among a total number X of preambles, allocating (S4) a dedicated preamble to a terminal responsive to a connection request received from said terminal, and identifying (S9) said terminal when requesting random access, based on the allocated dedicated preamble contained in a random access request received;

and as well there is provided a device, configured to provide for random access in a local area network environment, and comprising a control module configured to define (S1) a set of N dedicated preambles among a total number X of preambles, allocate (S4) a dedicated preamble to a terminal responsive to a connection request received from said terminal, and identify (S9) said terminal when requesting random access, based on the allocated dedicated preamble contained in a random access request received.

Advantageous further developments are as set out in respective dependent claims thereof.

According to a second aspect of the present invention, there is provided a method, comprising providing for random access in a local area network environment, and requesting (S3) a connection to be established with a network transceiver device, receiving (S5) information on a dedicated preamble being allocated, and issuing (S8) a random access request to said network transceiver device which includes the allocated dedicated preamble;

and as well there is provided a device, configured to provide for random access in a local area network environment, and comprising a control module configured to request (S3) a connection to be established with a network transceiver device, receive (S5) information on a dedicated preamble being allocated, and issue (S8) a random access request to said network transceiver device which includes the allocated dedicated preamble.

Advantageous further developments are as set out in respective dependent claims thereof.

According to a further aspect thereof, there are provided computer program products comprising computer-executable components which, when executed on a computer, are configured to implement the respective methods as set our herein above. The above computer program product/products may be embodied as a computer-readable storage medium.

Thus, improvement in relation to providing for random access in a local area network environment is achieved by those methods, devices and computer program products, in connection with at least exemplary embodiments and/or aspects, as follows:

the RACH overhead inherent to previously adopted scenarios is dispensed with and thus saved, a delay in RACH, at least for events such as RRC connection reestablishment and/or for UL data arrival is avoided, even initial access is simplified and shortened if a timer determining a validity of a dedicated UE specific RA preamble is long enough, RACH trigger events that—at least without exemplary aspects of the invention implemented—originally have contention based RACH delay, will be decreased down to a delay inherent to non-contention based RACH delay, as the RACH procedure is changed for those events from contention based to non-contention based RACH procedure, signalling messages are reduced from 4 messages down to 2 messages for RACH procedures, compared to earlier procedures excessive preambles, which would never be used in LA scenario, are exploited to thereby further optimize RACH procedure, without any or hardly any additional costs.

BRIEF DESCRIPTION OF DRAWINGS

For a more complete understanding of aspects and/or example embodiments of the present invention, reference is now made to the following description taken in connection with the accompanying drawings in which:

FIG. 4 schematically illustrates a signaling diagram according to a further exemplary embodiment of the invention.

DESCRIPTION OF EXEMPLARY EMBODIMENTS

Figure 1:
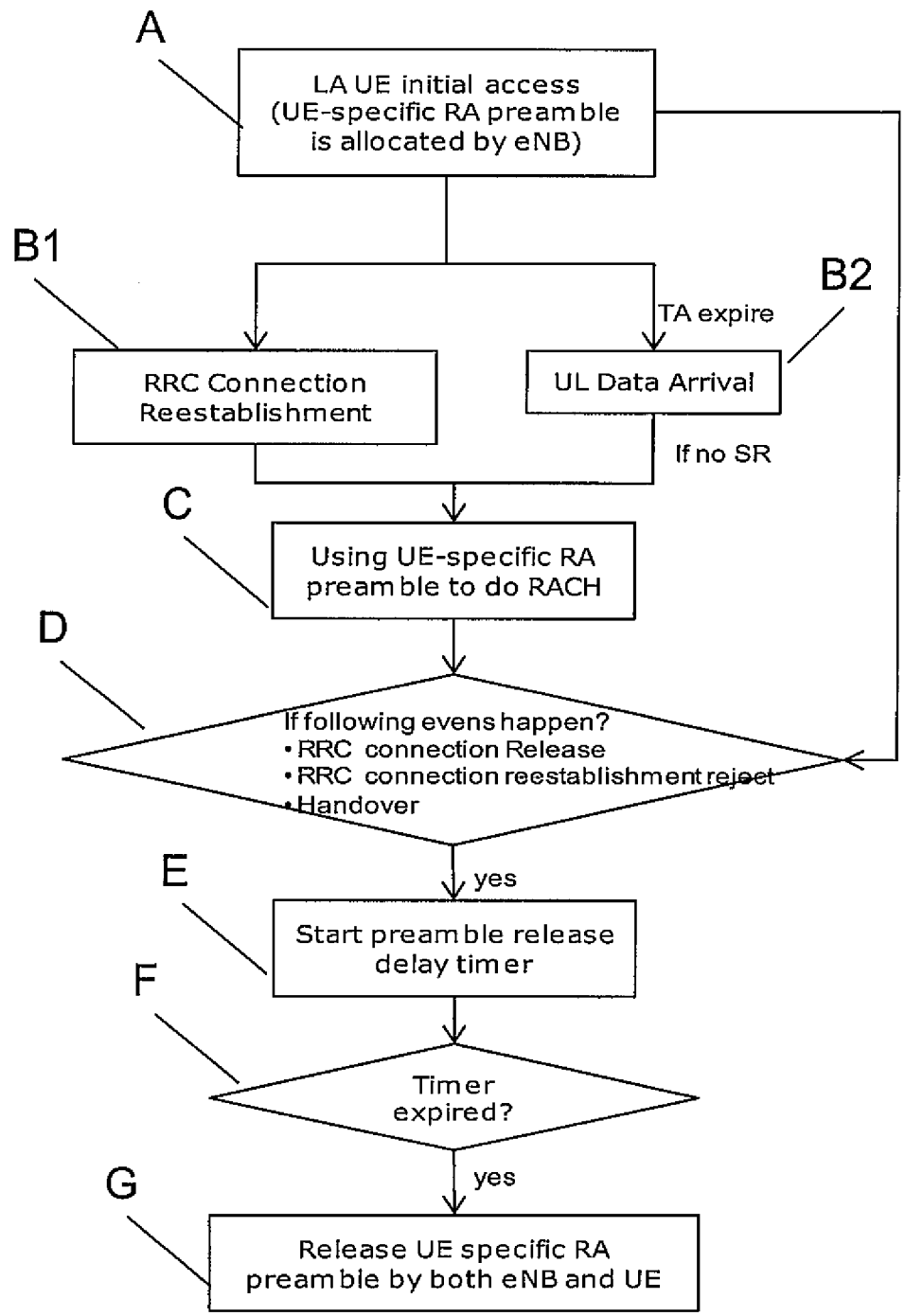
FIG. 1 schematically illustrates in overview the integrated procedure using a UE-specific RA preamble in a LA eNB.

Exemplary aspects and/or embodiments of the invention will be described herein below.

It is to be noted that the following exemplary description refers to a local area LA environment in LTE and/or LTE-A. However, LA environments under other network standards such as UMTS (universal mobile telecommunication standard) may also benefit in the same or at least similar manner with exemplary aspects of the present invention implemented thereto.

Nonetheless, in order to avoid the explanations to become too voluminous, the exemplary aspects/embodiments are described with particular reference to e.g. handheld mobile communication devices referred to as user equipments UE, such as so-called smart phones, or personal digital assistants PDA's or the like. Note that any other handheld devices or digital devices can be used. Likewise, the exemplary aspects/embodiments are described with particular reference to e.g. en evolved Node_B eNB. The UE and eNB are assumed for purposes of explanations to conform to LTE and/or LTE-A standard(s), but aspects of the invention could also be applied to terminals and/or network transceiver devices conformant to another standard, e.g. UMTS. However, it is to be understood that this serves for explanatory purposes only. Thus, focusing in the subsequent description and explanation to methods and/or devices as known from LTE/LTE-A is by no way intended to be construed as limiting the scope of the present invention.

Preamble Numbers for Random Access are already inherent to the LTE and/or LTE-A systems. That is, there are in total 64 preambles for random access, among which there are a maximum of 60 preambles which could be configured for dedicated preambles. While, as mentioned above, the typical LA-UE number is less than ten, which is significantly below the total preamble number as well as the maximum number of dedicated preambles. Thus, under one aspect of this invention, it is made use of those excessive preambles which would never be used in LA scenario, to thereby further optimize RACH procedure, without any or hardly any additional costs.

In the following sections, the proposed method to optimize RACH procedure in LA scenario and based on utilization of excessive random access preambles, is described in more detail.

Subsequently, individual features are listed, based on the reliable working assumptions that—for a LA deployment—only a few UEs need to be supported (at least in terms of RACH procedures), e.g. less than N UEs, in which N could be e.g. 10.

Feature #1: Each LA UE "owns" one dedicate random access preamble, so called UE-specific RA (random access) preamble This UE-specific RA preamble is used for specific LA UE after allocated until released; this UE-specific RA preamble should be selected/allocated by eNB from dedicated preamble set; this UE-specific RA preamble could for example be used for RRC connection re-establishment and UL data arrival.

Feature #2: The UE-specific RA preamble is allocated by eNB

The UE-specific RA preamble or an index thereto could be allocated for LA UE in an RRC message during an initial access procedure or handover procedure. The RACH procedure using UE-specific RA preamble as proposed in connection with exemplary embodiments of the present invention is then the same as a non-contention based RACH procedure.

Feature #3 (optional): A preamble release delay timer is defined for the UE-specific RA preamble, which is used to delay the preamble release in case UE will reconnect to the LA eNB This preamble release delay timer is configured by eNB, e.g. during LA UE initial access or handover procedure;

Feature #5: Upon the transmission of the UE-specific RA preamble, the UE should take the random access response, RAR, as received from the eNB as a sign of a successful random access procedure.

FIG. 1 schematically illustrates an integrated overview over a procedure to use a UE-specific RA preamble in LA eNB as an implementation of at least exemplary ones of the above features forming part of the invention.

In a step A, a UE-specific RA preamble is allocated by an eNB during a procedure such as a LA UE initial access procedure. For example, during LA UE RRC connection establishment procedure, after UE send RRCConnectionRequest message, eNB will respond with RRCConnectionSetup message. Then, the eNB may include information on the UE-specific RA preamble in such message, i.e. either the UE specific preamble as such or an index (pointer) to such UE specific RA preamble.

One example for how and/or where to insert new information into RRCConnectionSetup message (from eNB to UE) could be as follows:

```
-- ASN1START
RRCConnectionSetup ::=          SEQUENCE {
    rrc-TransactionIdentifier       RRC-TransactionIdentifier,
    criticalExtensions              CHOICE {
        c1                              CHOICE {
            rrcConnectionSetup-r8           RRCConnectionSetup-r8-IEs,
            rrcConnectionSetup-r11          RRCConnectionSetup-r11-IEs,
            spare6 NULL, spare5 NULL, spare4 NULL,
            spare3 NULL, spare2 NULL, spare1 NULL
        },
        criticalExtensionsFuture        SEQUENCE { }
    }
}
RRCConnectionSetup-r8-IEs ::=   SEQUENCE {
    radioResourceConfigDedicated    RadioResourceConfigDedicated,
    nonCriticalExtension            RRCConnectionSetup-v8a0-IEs     OPTIONAL
}
RRCConnectionSetup-v8a0-IEs ::= SEQUENCE {
    lateNonCriticalExtension        OCTET STRING                    OPTIONAL,
    -- Need OP
    nonCriticalExtension            SEQUENCE { }                    OPTIONAL
    -- Need OP
}
RRCConnectionSetup-r11-IEs ::=  SEQUENCE {
    radioResourceConfigDedicated    RadioResourceConfigDedicated,
    rach-ConfigDedicated            RACH-ConfigDedicated            OPTIONAL,
    -- Need OP
    nonCriticalExtension            NULL
}
-- ASN1STOP
``` this preamble release delay timer is triggered/started by events, which may include but are not limited to the following events: RRC connection release, Handover, RRC connection reestablishment Reject. This preamble release delay timer is maintained by both, UE and eNB. The eNB will release the UE-specific RA preamble after the timer is expired, while, a UE will release the UE-specific RA preamble after the timer is expired or when the UE accesses to another eNB (e.g. after successfully completed handover)

Feature #4: The UE should choose to use the allocated UE-specific RA preamble for RACH procedure in case RACH is needed and no explicit (dedicated) resource is allocated.

The underlined text in bold italics is the newly added information in so the RRCConnectionSetup message. In this new added information, rach-ConfigDedicated IE will indicate the ra-PreambleIndex, and UE could then take this preamble as the UE-specific RA preamble until released. At the same time, UE could ignore ra-PRACH-MaskIndex in rach-ConfigDedicated IE, or eNB could always set ra-PRACH-MaskIndex to 0 in this case, to enable all PRACH resource.

Prior to allocating a UE specific RA preamble, UE-specific RA preambles have to be selected among exisiting defined preambles. Namely, there are a maximum of 64 RA preambles for one cell, represented by an eNB, which include two kinds of preambles. Those kinds are the so-called shared preambles and dedicated preambles. An eNB could partition the 64 total preambles so as to set a maximum of 60 preambles as dedicated preamble for selection to be assigned to UEs. This is an extreme case in which most preambles are allocated to serve as a dedicated preamble, but this is not unlikely in a LA scenario, since the (randomly) accessing UEs to a LA network, i.e. the eNB thereof, is expected to be very low so that a number of (only) 4 shared preambles could be enough in most cases. As an example, eNB could select a UE-specific RA preamble from the set of dedicated preambles. This is a totally backward compatible method. No new preambles need to be designed and no new preamble set is needed. Since the number of accessing LA-UEs is expected to be very low, up to 60 UE-specific RA preamble could be enough.

Then, in a step B1, for an RRC connection reestablishment case, or in a step B2, for an UL data arrival case, those events are in conventional scenarios (differing from scenarios that are in line with at least exemplary embodiments of the present invention)—expected to trigger a contention based RACH procedure to re-establish RRC connection or to inform the eNB that there is UL data that need to be scheduled. Likewise, also for the purpose of the present invention, those events exemplify events that trigger a RACH procedure in the environment of the present invention, but with some modifications in the RACH procedure which are described herein below.

In conventional scenarios, C-RNTI of UE would be included in Msg3 and the network transceiver device eNB could only identify (or "authenticate") the UE after eNB correctly receives Msg3 from UE. Since this is the contention based RACH and Msg3 is based on HARQ (hybrid automatic repeat request), there is a possibility to have contention resolution failure and also delays due to retransmissions of Msg3, as mentioned before.

Instead, in line with at least exemplary embodiments of the present invention based on usage of a UE-specific RA preamble, the eNB can identify a LA-UE "at first glance". Namely, then, in a step C in FIG. 1, the UE will use the allocated UE specific RA preamble to compose its RA request, i.e. it will include the UE specific preamble in message Msg 1 of the RACH procedure. When the eNB receives such a RACH request (Msg 1) including a UE-specific RA preamble, the eNB knows and identifies which UE sent that request. The RACH procedure could then be regarded as successful in advance from the eNB point of view. The eNB will thus respond with a random access response message, Msg2, and give UL grant. This prevents the delays and avoids contention resolution failure. For both example cases—RRC connection reestablishment and UL data arrival—the UE could consider random access successfully completed after successful receipt of RAR from the eNB, i.e. already upon receipt of message Msg2. Then, UE and eNB will save Msg3 and Msg4 and have comparable and even identical delays with non-contention based RACH.

Figure 2:
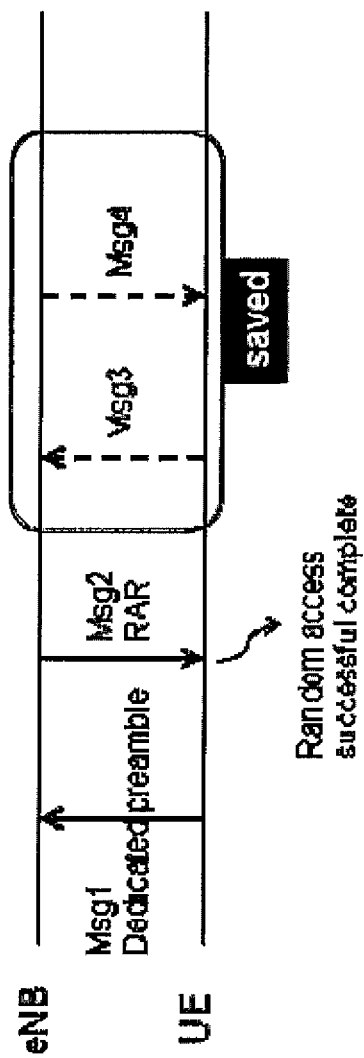
FIG. 2 schematically illustrates an optimized RA procedure in terms of signaling using a UE-specific RA preamble.

FIG. 2 schematically illustrates the above explained relations as it illustrates an optimized RA procedure in terms of signaling using a UE-specific RA preamble.

Moreover, as mentioned above, it is optionally possible to use a preamble release delay timer, i.e. to enhance the scenario described herein above so far by such timer. The intention of such a timer is to maintain the UE-specific RA preamble by both, the UE and the eNB for a while after the UE is not in the LA cell. By virtue thereof, the UE could fast be reconnected to the eNB of the LA cell if needed. Nonetheless, this feature of the invention referred to above as feature 3 is optional, and features #1 and #2, even without this feature #3, could already form the complete solution and obtain most of the advantages mentioned above.

With such timer, both the eNB and the UE, will maintain the allocated UE-specific RA preamble, substantially for the period defined by the timer. When it is necessary for the UE to reconnect to the eNB, the UE will re-use the UE specific RA preamble for a new RACH message towards the eNB, and the eNB will recognize this UE by the UE-specific RA preamble, and fast establish RRC connection for this UE, if the UE context is still saved in eNB.

Figure 3:
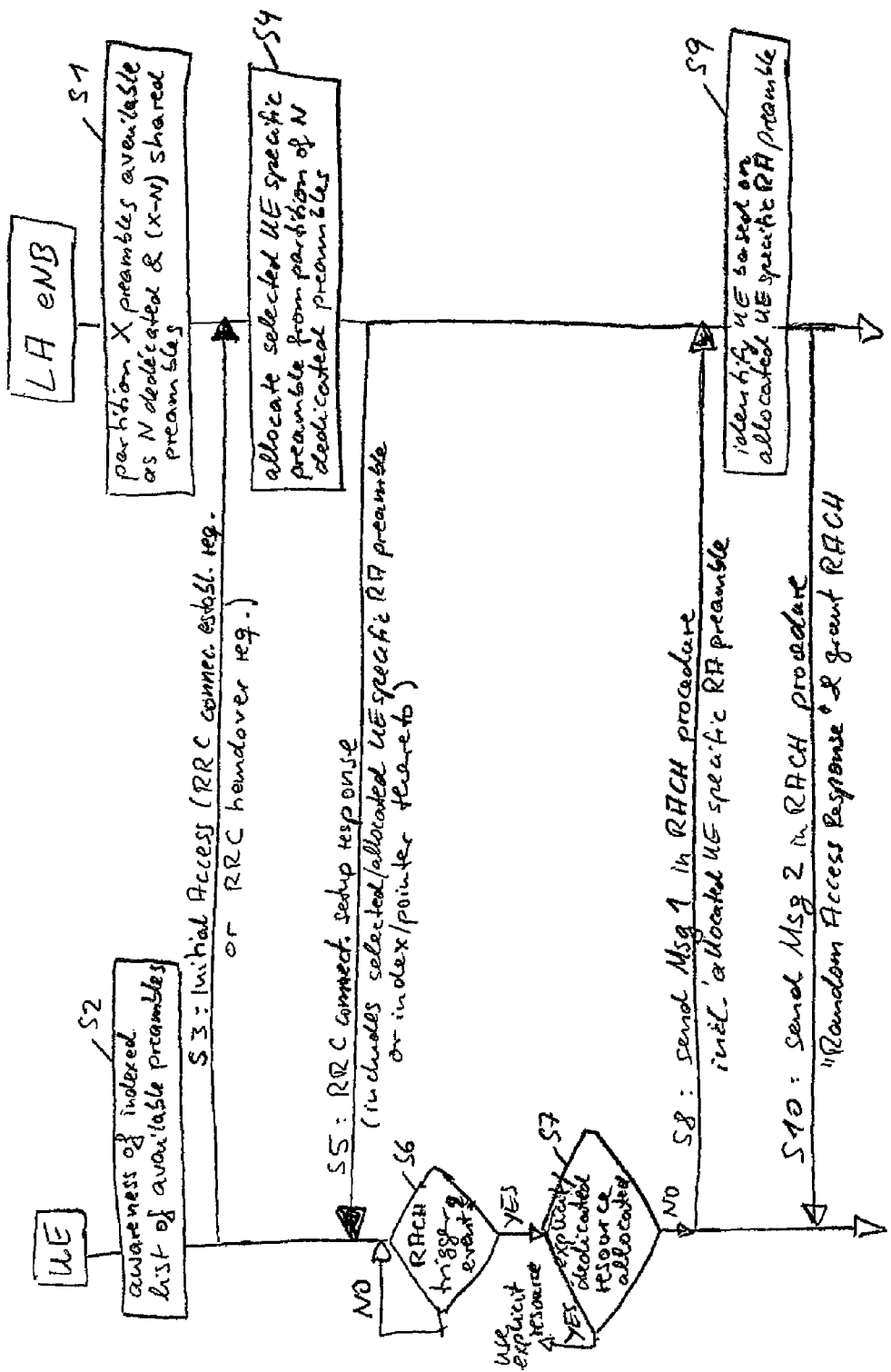
FIG. 3 schematically illustrates a signaling diagram according to an exemplary embodiment of the invention.

FIG. 3 schematically illustrates a signaling diagram according to an exemplary embodiment of the invention. Illustrated is a terminal such as a user equipment UE, as well as a network transceiver device such as a eNB and actions taken by the respective entity and signaling between the entities. A sequence (in time) of actions/signaling is represented in the vertical direction, while signals are illustrated in horizontal direction. It is assumed that the actions/processing of a respective entity is carried out by and/or under control of a respective control module thereof, so as to keep the explanation understandable and so as to avoid to go into detail in terms of other modules such as modems, antenna drive circuits, or the like, which are of course also present at each respective device UE and eNB. The same shall also apply for the description of FIG. 4 to follow.

In a step S1, an eNB partitions the number X of available preambles, e.g. 64 in total, into N dedicated preambles, i.e. the UE specifica RA preambles, e.g. 60, while the remaining X-N preambles (4 in this example) are shared preambles.

In a step S3, a UE sends an initial access request to the eNB. This can be an RRC connection establishment request, or optionally also a RRC handover request.

In a step S4, the eNB allocates a selected one of the UE specific RA preambles to the requesting UE.

In a step S5, the eNB informs the UE about the allocated preamble. To this end, it may include the allocated preamble in a response to said terminal, or include an index pointing to the allocated preamble in a response to said terminal. In the latter case, the UE needs to be enabled to derive the preamble based on the index. For such scenario, the UE is aware of and e.g. has stored a table of an indexed list of all available preambles, as shown in a step S2.

In a step S6, the UE being informed of the allocated UE specific RA preamble monitors occurring events in terms of being an event that triggers/necessitates a random access channel to be allocated, i.e. RACH trigger events are monitored/detected. If no RACH trigger event is detected, monitoring continues. If a RACH trigger event is detected, it is checked in a step S7 whether an explicit and/or dedicated resource needs to be allocated. If so (YES) the process continues otherwise and the explicit resource is allocated and used. If not (NO in S7), the UE sends in a step S8 a message Msg1 in a subsequent RACH procedure. This message Msg1 includes the UE specific RA preamble that was allocated to the UE beforehand by the eNB.

In a step S9, the eNB then identifies the requesting UE based on the previously allocated UE specific RA preamble. Then, the eNB sends, in step S10, a random access response RAR messages as message Msg2 in the RACH procedure. This message already grants random access to the UE, thus alleviating the previously discussed additional messages Msg3 and Msg4 in conventional RACH procedures that need to be contention based RACH procedures.

FIG. 4 schematically illustrates a signaling diagram according to a further exemplary embodiment of the invention. Similar notions as given above for FIG. 3 are applicable also for FIG. 4. Moreover, the same steps are denoted with the same reference signs and illustrated merely as a correspondingly labeled box. A repeated description of those identical actions/messages is thus omitted and only the differences/additional actins/messages will be focused on.

As illustrated in FIG. 4, steps S1, S2 (if present), S3 and S4 are as in relation to FIG. 3. In the exemplary another embodiment shown in FIG. 4, in a step S4a the eNB configures the preamble release timer. (This could also be accomplished in step S4, but is shown as separate step to emphasize the additional feature.) The preamble release timer can be an upward counting timer or a countdown timer. In a step S5a, the eNB informs the UE about the configured preamble release timer. (Likewise, this could also be accomplished in step S5, but is shown as separate step to emphasize the additional feature.)

Once the timer is configured, the eNB monitors occurrence of timer trigger events, as illustrated in step S4b1. Likewise, so does the eNB as shown in step S4b2, after being informed of the timer being configured. Step S4b1 can form part of S4a already. However, in order to reduce internal processing load for the eNB, it could be launched after a RACH request is received from a UE that uses a UE specific RA preamble for which the timer was configured. Thus, after a message was received at the eNB in step S8. The presently chosen location of S4b1 is thus one of possible examples only.

Also, step S4b2 can already be launched immediately after receipt of the message in step S5 and/or S5a. However, in order to reduce internal processing load for the UE, it could be launched after a RACH request is sent to the eNB from the UE using a UE specific RA preamble for which the timer was configured. Thus, after the message in step S8 was sent to the eNB, as illustrated.

Again, steps S9 and S10 are as in relation to FIG. 3.

In steps S11a (at the UE) and S11b (at the eNB) it is checked whether a monitored timer trigger event is actually such an event. If not (NO), the check loops back and/or waits for the next event to occur. If YES, the timer is started in step S12a, S12b at the UE and the eNB, respectively. Since both detect the same event, it could be safe to assume that the timers are started rather simultaneously. Events triggering said timer are at leak a RRC connection release, a handover, or a RRC connection re-establishment rejection. Optionally (not shown in FIG. 4), the entity starting its timer could additionally inform the other entity about this action being taken, so as to compensate for a potential failure in event detection at the other entity.

The UE is thus enabled to re-use the UE specific RA preamble in such event. E.g. as shown in a step S13 (similar to S8), the UE (re-)sends a message Msg1 in a RACH procedure which includes the preamble. This enables the eNB in a step S14 (similar to step S9) to identify the UE based on the allocated UE specific RA preamble and to respond in a step S15 with a RAR message Msg2 (similar to step S10). Afterwards, in steps S16a and S16b at the UE and eNB side, respectively, it is checked whether the timer has expired.

At the eNB side, if not (NO), the process goes back to stage S16b or to a stage before step S14 (but still after S12b to avoid restart of the timer), and the UE specific RA preamble is maintained allocated, i.e. not released. If expired (YES) at the eNB side, the UE specific preamble is released (S18b) and will not serve for identifying the UE at the eNB any longer.

At the UE side, the process goes back, via step S17 to be explained, to stage S16a or to a stage before step S13 (but still after S12a to avoid restart of the timer), and the UE specific RA preamble is maintained allocated, i.e. not released. If expired (YES) at the UE side, the UE specific preamble is released (S18a) and will not serve for identifying the UE at the eNB any longer. In step S17, at the UE, it is checked whether a handover was successful or not. If successful (YES in S17) the process goes to step S18a and the preamble is released even if the timer has not yet expired. If not (NO in S17) the process returns to stage S16a or to a stage before step S13, as mentioned above.

Note that although the illustration is given sequentially, some of the steps are performed and/or active in parallel. E.g. in case S13 will not be successful, it could be repeated as long the preamble is not released. Also, another event that would normally trigger the timer could occur, but as long as the timer is not expired, it is not restarted while the still un-releassed UE specific preamble could then be used again for a message MSg1 in relation to such event.

It is to be understood that embodiments of the present invention according to the aspects mentioned herein above may be implemented in software, hardware, application logic or a combination of software, hardware and application logic. The software, application logic and/or hardware generally, but not exclusively, may reside on a control module of a user equipment UE or on a control module of an eNB.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, at least some of different functions discussed herein may be performed in a different order and/or concurrently with each other.

Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods, devices and computer program products in relation to providing for random access in a local area network environment, and encompasses, from an eNB perspective, defining (S1) a set of N dedicated preambles among a total number X of preambles, allocating (S4) a dedicated preamble to a terminal responsive to a connection request received from said terminal, and identifying (S9) said terminal when requesting random access, based on the allocated dedicated preamble contained in a random access request received. From a UE perspective, it encompasses requesting (S3) a connection to be established with a network transceiver device, receiving (S5) information on a dedicated preamble being allocated, and issuing (S8) a random access request to said network transceiver device which includes the allocated dedicated preamble. It also addresses correspondingly configured devices and computer program products.

LIST OF ACRONYMS, ABBREVIATIONS AND DEFINITIONS

DL Downlink
E-UTRA Evolved Universal Terrestrial Radio Access
eNB evolved NodeB
LA Local Area
LTE Long Term Evolution LTE-A Long Term Evolution Advanced
PRACH Physical Random Access Channel
RA Random Access
RACH Random Access Channel
RAR Random Access Response
RNTI Radio Network Temporary Identifier
RRC Radio Resource Control
UE User Equipment
UL Uplink
UMTS Universal Mobile Telecommunication System

What is claimed is:

1. A method, implemented by a network transceiver device, comprising:
defining a set of N dedicated preambles among a total number X of preambles, where N and X are each integers greater than one;
allocating a dedicated preamble to a terminal responsive to a connection request received from said terminal;
receiving a random access request message from the terminal as a first message in a random access channel (RACH) procedure, and identifying said terminal when requesting random access, based on the allocated dedicated preamble contained in the received random access request received; and
granting random access to said terminal upon being identified based on the dedicated preamble and transmitting a random access response message as a second message in the RACH procedure to complete the RACH procedure without requiring further messaging between the terminal and the network transceiver device as part of the RACH procedure.

2. A method according to claim 1, further comprising informing said terminal about the allocated dedicated preamble.

3. A method according to claim 2, wherein said informing comprises
including the allocated preamble in a response to said terminal.

4. A method according to claim 2, wherein said informing comprises
including an index pointing to the allocated preamble in a response to said terminal.

5. A method according to claim 1, further comprising configuring a timer for releasing the allocation of the dedicated preamble to said terminal.

6. A method according to claim 5, further comprising monitoring an occurrence of events triggering the timer, starting the timer upon occurrence of a timer trigger event, and
releasing the allocated dedicated preamble upon expiry of the timer.

7. A method according to claim 5, further comprising re-identifying said terminal requesting random access based on the allocated dedicated preamble contained in a subsequent random access request received, as long as the allocation is not released.

8. A method according to claim 1, wherein
said connection request is a radio resource control (RRC) connection establishment request or a RRC handover request, and
said random access request is at least a RRC re-establishment request, or a request in relation to uplink data arrival while RRC connected.

9. A method according to claim 6, wherein
said events triggering said timer include at least a radio resource control (RRC) connection release, a handover, or a RRC connection re-establishment rejection.

10. A device, configured to provide for random access in a local area network environment, and comprising:
circuitry configured to
define a set of N dedicated preambles among a total number X of preambles, where N and X are each integers greater than one;
allocate a dedicated preamble to a terminal responsive to a connection request received from said terminal;
receive a random access request message from the terminal as a first message in a random access channel (RACH) procedure, and identify said terminal when requesting random access, based on the allocated dedicated preamble contained in the received random access request received, and
grant random access to said terminal upon being identified based on the dedicated preamble and transmit a random access response message as a second message in the RACH procedure to complete the RACH procedure without requiring further messaging between the terminal and the device as part of the RACH procedure.

11. A method, implemented by a terminal, comprising:
requesting a connection to be established with a network transceiver device;
receiving information on a dedicated preamble being allocated;
transmitting a random access request message as a first message in a random access channel (RACH) procedure, the allocated dedicated preamble being contained in the transmitted random access request; and
receiving a random access response message as a second message in the RACH procedure to complete the RACH procedure without requiring further messaging between the terminal and the network transceiver device as part of the RACH procedure.

12. A method according to claim 11, wherein said receiving information comprises
extracting the allocated dedicated preamble from a response from said network transceiver device.

13. A method according to claim 11, further comprising detecting an event triggering a random access channel allocation procedure, for which event no specific resources are to be allocated, and
responsive thereto, issuing said random access request.

14. A method according to claim 11, further
comprising maintaining a configured timer for releasing the allocation of the dedicated preamble to said terminal.

15. A method according to claim 14, further comprising
monitoring an occurrence of events triggering the timer, starting the timer upon occurrence of a timer trigger event, and
releasing the allocated dedicated preamble upon expiry of the timer or in case of a successful handover towards another network transceiver station.

16. A method according to claim 14, further comprising
re-issuing a subsequent random access request which includes the allocated dedicated preamble, as long as the allocation is not released.

17. A method according to claim 11, wherein
said connection request is a radio resource control (RRC) connection establishment request or a RRC handover request, and
said random access request is at least a RRC re-establishment request, or a request in relation to uplink data arrival while RRC connected.

18. A method according to claim 15, wherein said events triggering said timer are at least a radio resource control (RRC) connection release, a handover request, or a RRC connection re-establishment rejection.

* * * * *